(12) United States Patent
Chahal et al.

(10) Patent No.: US 7,774,447 B2
(45) Date of Patent: Aug. 10, 2010

(54) PERFORMING SIMPLIFIED TROUBLESHOOTING PROCEDURES TO ISOLATE CONNECTIVITY PROBLEMS

(75) Inventors: Gurinderjit Chahal, Fremont, CA (US); Shashi Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 284 days.

(21) Appl. No.: 11/411,602

(22) Filed: Apr. 26, 2006

(65) Prior Publication Data

US 2007/0255733 A1 Nov. 1, 2007

(51) Int. Cl.
G06F 15/177 (2006.01)
G06F 11/00 (2006.01)

(52) U.S. Cl. .......................................... 709/223; 714/4
(58) Field of Classification Search .................... None
See application file for complete search history.

(56) References Cited

U.S. PATENT DOCUMENTS

| | | | | |
|---|---|---|---|---|
| 5,825,772 A | * | 10/1998 | Dobbins et al. | 370/396 |
| 5,920,699 A | * | 7/1999 | Bare | 709/225 |
| 5,982,753 A | * | 11/1999 | Pendleton et al. | 370/252 |
| 6,188,691 B1 | * | 2/2001 | Barkai et al. | 370/390 |
| 6,515,969 B1 | * | 2/2003 | Smith | 370/256 |
| 6,625,146 B1 | * | 9/2003 | Merchant et al. | 370/389 |
| 6,678,241 B1 | * | 1/2004 | Gai et al. | 370/216 |
| 6,775,290 B1 | * | 8/2004 | Merchant et al. | 370/395.53 |
| 7,062,595 B2 | * | 6/2006 | Lindsay et al. | 710/315 |
| 7,286,491 B1 | * | 10/2007 | Smith | 370/256 |
| 7,428,237 B1 | * | 9/2008 | Gai et al. | 370/395.53 |
| 7,436,832 B2 | * | 10/2008 | Gallatin et al. | 370/389 |
| 7,451,204 B2 | * | 11/2008 | Shiga et al. | 709/223 |
| 7,463,588 B1 | * | 12/2008 | Tanaka et al. | 370/238 |
| 7,554,997 B1 | * | 6/2009 | Schlichter et al. | 370/402 |
| 2002/0080800 A1 | * | 6/2002 | Lee et al. | 370/395.54 |
| 2002/0104039 A1 | * | 8/2002 | DeRolf et al. | 714/30 |
| 2002/0112076 A1 | * | 8/2002 | Rueda et al. | 709/245 |
| 2002/0118692 A1 | * | 8/2002 | Oberman et al. | 370/419 |
| 2004/0184401 A1 | * | 9/2004 | Nguyen et al. | 370/216 |
| 2004/0199627 A1 | * | 10/2004 | Frietsch | 709/224 |
| 2005/0108444 A1 | * | 5/2005 | Flauaus et al. | 710/15 |
| 2005/0240799 A1 | * | 10/2005 | Manfredi et al. | 714/4 |
| 2006/0031446 A1 | * | 2/2006 | Hamedi | 709/223 |
| 2006/0031488 A1 | * | 2/2006 | Swales | 709/224 |
| 2006/0098670 A1 | * | 5/2006 | Voit et al. | 370/401 |
| 2006/0133368 A1 | * | 6/2006 | Tolliver | 370/389 |
| 2006/0143344 A1 | * | 6/2006 | Lindsay et al. | 710/105 |

(Continued)

OTHER PUBLICATIONS

"D-Link DES-3225G Series 24-Port Fast Ethernet Swith User's Guide", Sixth Edition (Dec. 2001), pp. 14, 16, 20, 21, 23, 79, 98.*

(Continued)

*Primary Examiner*—Neveen Abel Jalil
*Assistant Examiner*—Tarek Chbouki
(74) *Attorney, Agent, or Firm*—Charles E. Krueger

(57) ABSTRACT

A method and apparatus for implementing troubleshooting of a network connectivity problem between a client computer coupled to a local switch and an end point on the network utilizes a client_proxy module instantiated on the local switch. The module automatically runs a series of tests utilizing the IP and MAC addresses of the client computer source addresses and reports the results of the tests.

4 Claims, 4 Drawing Sheets

U.S. PATENT DOCUMENTS

| | | | |
|---|---|---|---|
| 2006/0146823 A1* | 7/2006 | Ding | 370/390 |
| 2006/0168648 A1* | 7/2006 | Vank et al. | 726/4 |
| 2006/0248229 A1* | 11/2006 | Saunderson et al. | 709/245 |
| 2006/0251085 A1* | 11/2006 | Kalkunte et al. | 370/400 |
| 2007/0081541 A1* | 4/2007 | Umekage et al. | 370/395.2 |
| 2008/0001765 A1* | 1/2008 | Nguyen et al. | 340/588 |
| 2008/0089323 A1* | 4/2008 | Elias et al. | 370/389 |
| 2009/0052336 A1* | 2/2009 | Nguyen et al. | 370/245 |

OTHER PUBLICATIONS

Cisco Systems, Inc., Understanding the Ping and Traceroute Commands, Document ID: 12778, 18 pages, updated Feb. 2, 2006, copyright Cisco Systems, Inc. 1992-2006, available on the Internet at: <http://www.cisco.com/warp/customer/63/ping_traceroute.html>.

* cited by examiner

PERFORMING SIMPLIFIED TROUBLESHOOTING PROCEDURES TO ISOLATE CONNECTIVITY PROBLEMS

BACKGROUND OF THE INVENTION

Switches and routers provide a broad set of troubleshooting tools and utilities such as, for example, ping, Layer 3 traceroute, Layer 2 traceroute, etc., that can be combined with the output of various commands to debug network connectivity problems.

However, debugging can become quite challenging for users who are not network specialists. Even for the most basic connectivity problems, it is necessary to go through a step by step process to validate the connectivity checks and isolate the problem.

A typical example of a connectivity problem is depicted in FIG. 1 where a client computer 10, coupled to a port of a Local Switch 12, is unable to connect to an end station host server 14 located on the network 16. Debugging the problem involves running utilities such as ping and traceroute from the client computer.

Ping is a utility to determine whether a specific Internet Protocol (IP) address is accessible. It works by sending a packet to the specified address and waiting for a reply. Ping is used primarily to troubleshoot network connections. Traceroute utilities work by sending packets with low time-to-live (TTL) fields. The TTL value specifies how many hops the packet is allowed before it is returned. When a packet can not reach its destination because the TTL value is too low, the last host returns the packet and identifies itself. By sending a series of packets and incrementing the TTL value with each successive packet, traceroute finds out who all the intermediary hosts are.

These troubleshooting tools and utilities must be initiated at the client's computer because the connectivity problem occurs somewhere along the path taken by packets between the client and end station host server. This requires that the network administrator (the "Admin") be physically present at the client computer to run the tests or remotely connect with the user to guide her through performing the steps on the client computer.

Thus, either the user is diverted from other tasks in order to assist the Admin or the Admin must move from computer to computer to debug connectivity problems.

The challenges in the field of network administration continue to increase with demands for more and better techniques having greater flexibility and adaptability. Therefore, a need has arisen for a new system and method for debugging connectivity problems between a client computer and an end station host server connected to a network.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

One embodiment of the invention is a simplified interface that helps in troubleshooting connectivity problems. The interface does not necessarily point to the root cause of the problem, but helps isolate the problem. In computer networks without well-qualified networking administration personnel to support the network, as is common in small medium businesses, this embodiment makes it easier to troubleshoot connectivity problems.

Figure 1:
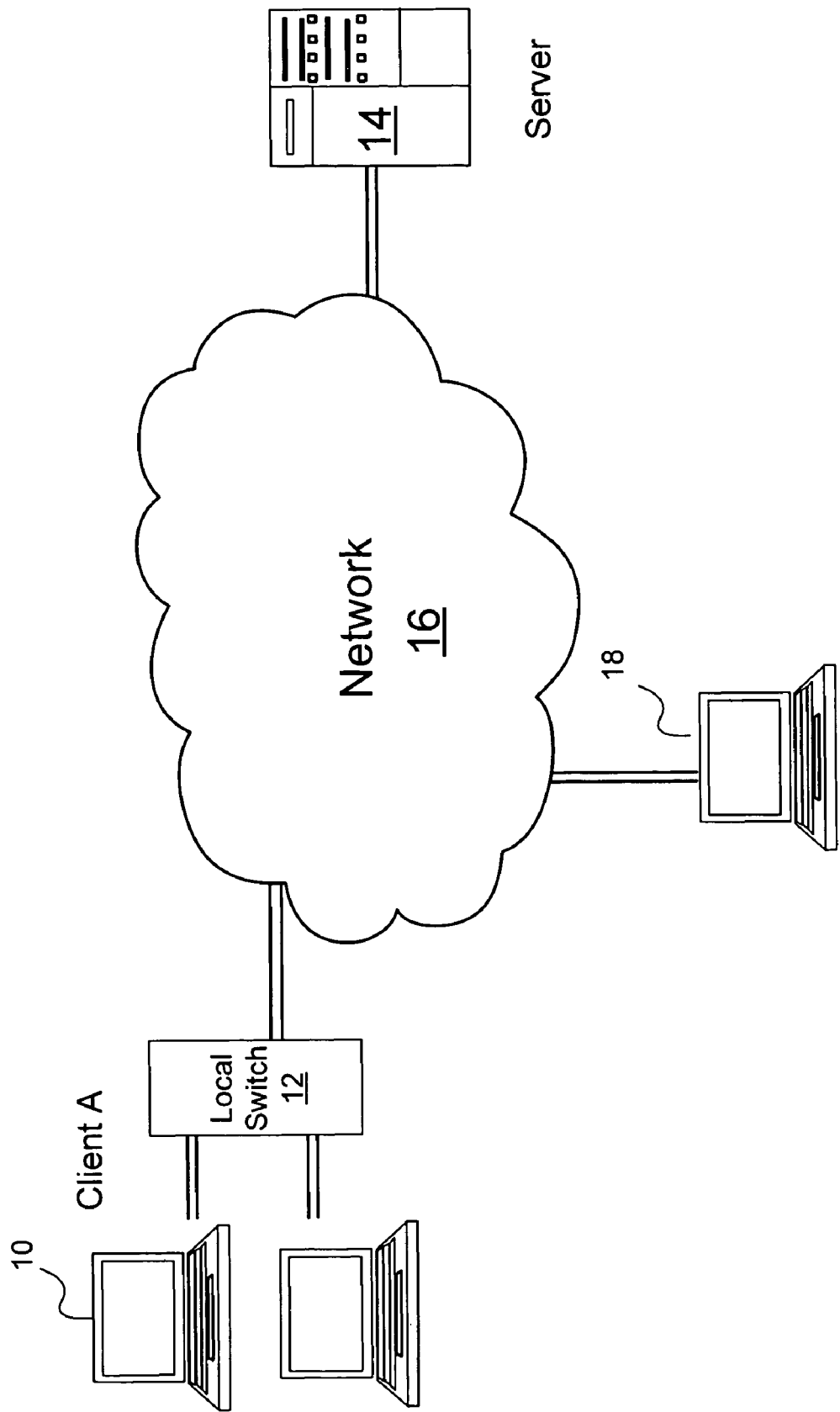
FIG. 1 is a view of a system suitable for implementing an embodiment of the invention.
Figure 2:
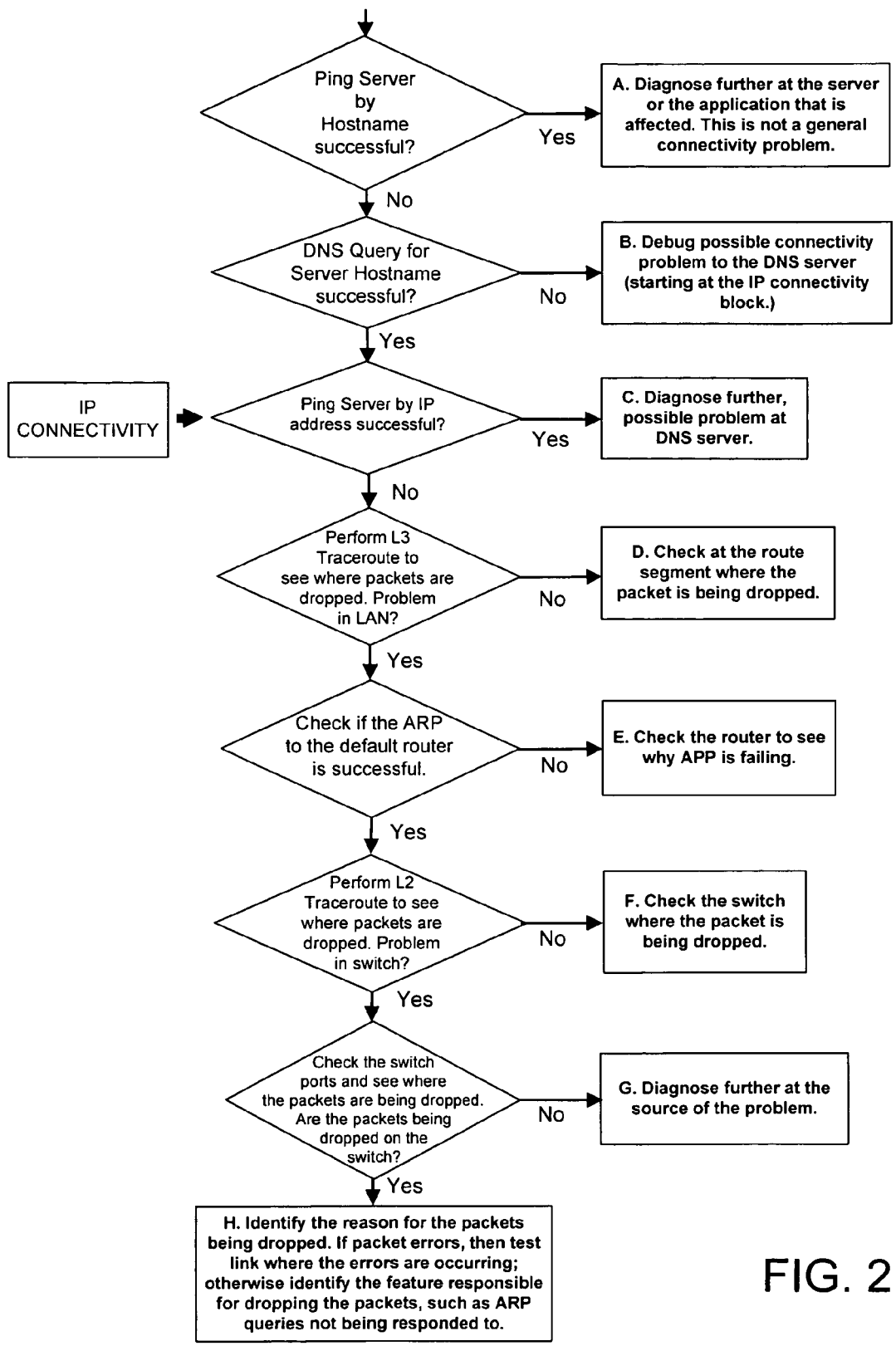
FIG. 2 is a flow chart depicting tests and analysis required to debug a connectivity problem.

Referring again to FIG. 1, client computer A 10 has problems connecting to an endpoint host server 14 located somewhere in the network 16. The client computer A 10 is directly connected to Ethernet switch 12 marked as "Local Switch" in FIG. 1. In typical networks, the user of client computer A would seek the help of the Admin to help troubleshoot the connectivity problem. The Admin would have to walk user through a series of steps that debug the problem as shown in the flowchart of FIG. 2.

In existing networks the Admin must perform the various tests in the decision blocks of the flowchart from the client computer A. Alternatively, the Admin can guide the user of client computer A through the tests.

Figure 3:
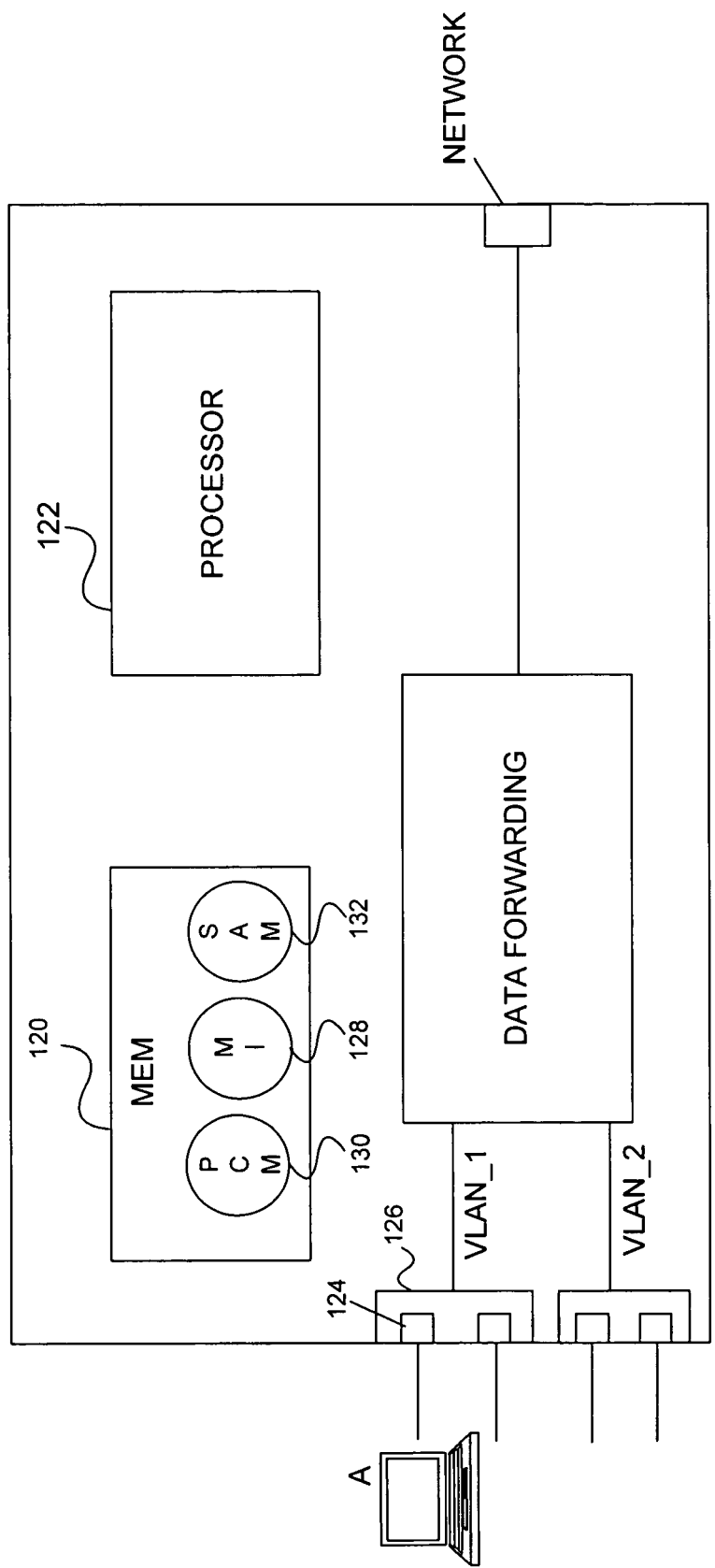
FIG. 3 is a flow chart depicting steps performed by an embodiment of the invention.

FIG. 3 shows a high-level, system block diagram of a Local Switch that may be used to execute software of an embodiment of the invention. The Local Switch includes a memory 120 which can be utilized to store and retrieve software and data for use by the software. Exemplary computer readable storage media include CD-ROM, floppy disk, tape, flash memory, system memory, and hard drive. Additionally, a data signal embodied in a carrier wave may be the computer readable storage medium. The local switch further includes subsystems such as a central processor 122, one or more network ports 124. In FIG. 3 the network ports are shown grouped into Virtual LANs (VLANs) 126. Other switches, routers, or network devices suitable for use with the invention may include additional or fewer subsystems.

FIG. 3 depicts some of the functionality included in the switch. The processor executes a management interface module 128, for example an http interface that permits management of the switch from remote locations connected to the network such as Admin computer 18 coupled to the network at a location remote from Local Switch 12. In the presently described embodiment, the Admin can log on to the switch from any workstation on the network and initiate a proxy_client module 130 that will perform the tests depicted in FIG. 2 as a proxy for the client computer A. Also, in this embodiment the switch provides this set of steps in an integrated manner, so that the Admin can perform the checks easily through the switch management interface. The switch may optionally include a switch_analysis module 132 having functions described below.

Figure 4:
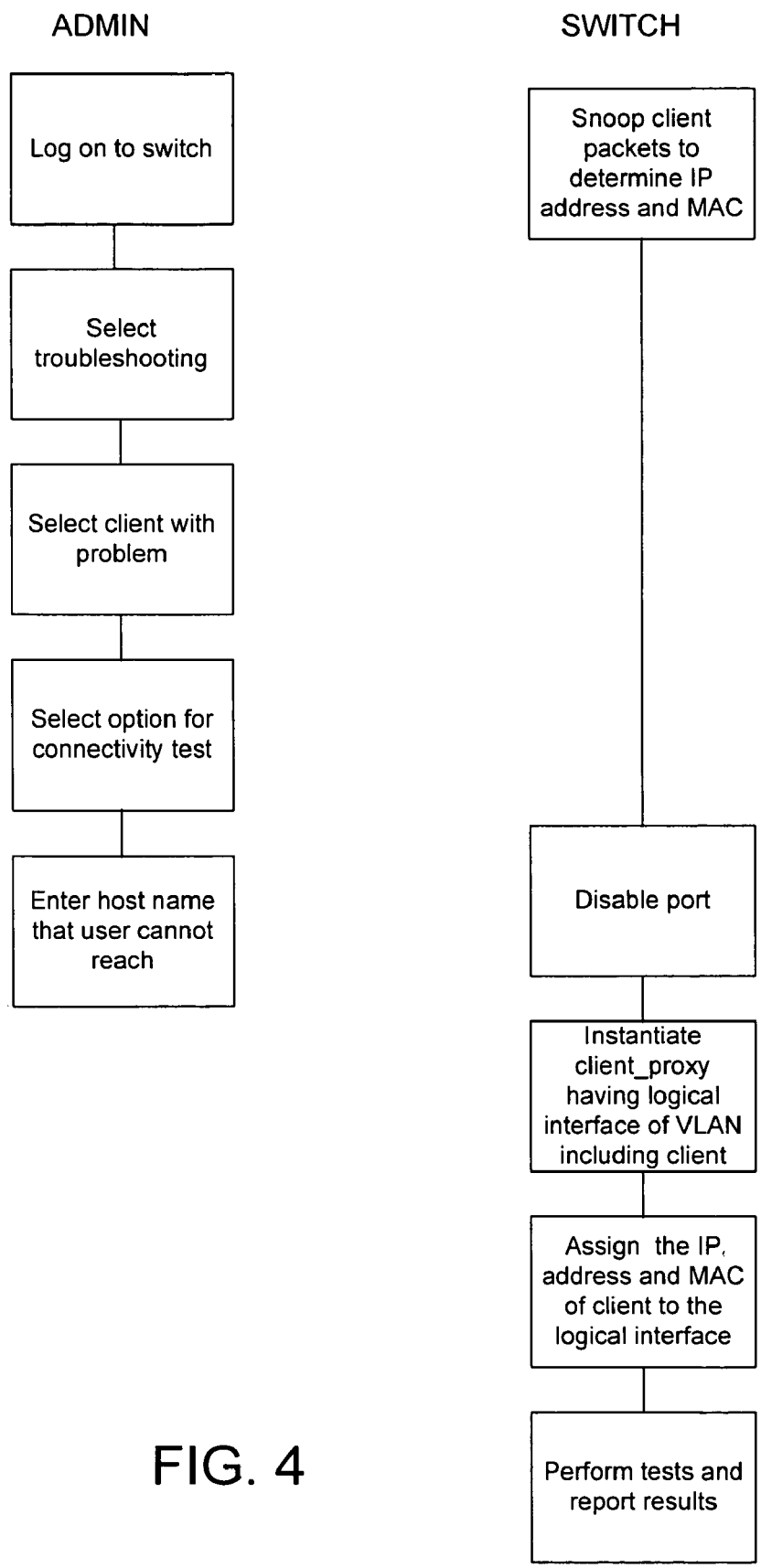
FIG. 4 is a block diagram of a network device configured to implement an embodiment of the invention.

FIG. 4 is a flow chart depicting the steps required to initiate the simplified troubleshooting feature of the switch and the events that happen at the switch. The Admin logs into the Local Switch, and selects the option for troubleshooting. The switch is aware of where the clients are connected, their IP addresses and Media Access Control (MAC) addresses. The Admin selects the client having the problem, and selects option for connectivity tests, and enters the server's host name that the client computer cannot reach.

In order to ensure that the results are exactly those that would be encountered by the client PC, the switch must disable the client port, so that traffic from the client does not interfere with the tests. When the administrator requests this troubleshooting functionality, the following things happen on the switch;

- A proxy_client module is initialized with an IP address and a MAC address of the client, and its associated VLAN as well as IP subnet information. The switch also has knowledge of the DNS server through its own configuration, while the rest of the information is gathered from snooping DHCP packets.
- The proxy_client module interacts with the IP stack through internal Layer 3 interface, and performs the ping, L3 traceroute, and L2 traceroute as described in the flowchart. The L2 traceroute is performed with the source MAC address of the client, and the destination MAC address of the router.
- Based on the results of the tests, the proxy_client module interfaces with switch_analysis module to perform the tasks in block H.

The switch Instantiates the proxy_client module that proxies for the client PC. The proxy_client module has a logical interface on the VLAN on which the client is connected, and assigns the interface the same IP address and MAC address as the client PC. The IP address and MAC addresses are learned through snooping of DHCP or ARP packets involving the client PC. The switch must use the client IP and MAC addresses, and the logical interface in the same VLAN as the client. This will ensure that the packets originating from the switch will traverse the same path as if they had originated from the client, which is necessary to ensure that the test results will point out the problems encountered by the client.

In the flow chart of FIG. 2, the steps in the decision blocks are performed automatically by the proxy_client module when it is instantiated. The steps listed in rectangle B are also performed by the proxy_client module as part of the IP connectivity block. The diagnostic analysis listed in rectangles A and C-G are performed by the Admin or some other diagnostic software not resident in the switch. The analysis of block H can be performed by switch_analysis module as described below.

The results of the tests can be put into can be put into three categories:

1. the problem is on some other device in the network where the device is identified by tests like ping/traceroute etc. OR;
2. the problem is on the switch OR;
3. the problem is on a link on the switch.

Accordingly, the switch can provide additional information for each of the following conditions:

- Block A—the Admin can use the switch to capture the packets being generated from the Client. This can be used to do further troubleshooting.
- Block B—the switch can perform the necessary set of tests to check the connectivity to the DNS server using the same algorithms as in the flow chart.
- Block D, E & F—It is possible for network management application to use the information reported by the switch and perform further diagnosis on the exact device in the network where the problem is occurring.
- Block H—the switch_analysis module can perform extensive checks and report the exact problem in most cases. Link level packet error statistics, and cable diagnostic tests can be used by the switch to determine if the problem is a cabling error or network adapter problem. Analysis of the switch hardware state and the state of different features can also help determine if problem is due to issues on the switch itself.

In one embodiment, the switch_analysis module performs the following functions:

- Disable the proxy_client, so that the switch can initiate tests with the client PC to check for problems on the client.
- The port on which the router is to be reached is checked for errors. If there are no errors, then the client side port is checked.
- The port on which the client is connected is checked for errors.
- Cable diagnostics tests are run to see if the cable has any problems.
- The switch pings the client to see if the IP stack on the client is responsive or not.
- If no problems are found, then features on the switch (such as access control lists) are checked to report all the types of traffic that the switch would not forward from the client PC.

This capability of the switch_analysis module added to the proxy_client module not only performs tasks that the user would otherwise have been required to do at the client station, it also integrates the results of the tests with knowledge of the network present within the switch, and as seen by the switch, to help get to the root cause of the connectivity problems quicker.

The invention has now been described with reference to the preferred embodiments. Alternatives and substitutions will now be apparent to persons of skill in the art. Accordingly, it is not intended to limit the invention except as provided by the appended claims.

What is claimed is:

1. A method comprising:

initializing a proxy_client module with a client IP address and a client MAC address of a client computer having a connectivity problem with an end station included in a network, with the proxy_client module stored on memory of a switch and with the switch having first, second, and third ports, where the client computer is coupled to the first port of the switch and where the network is coupled to the second port of the switch, and also initializing the proxy_client module with the identity of a VLAN on which the client computer is connected and with an IP address of the end station in the network, with the client IP address and client MAC address, the identity of the VLAN and the IP address of the end station provided by a remote computer coupled to the third port of the switch;

disabling the first port of the switch;

with the proxy_client module having a logical interface with the VLAN and utilizing the IP address of the end station in the network, the client IP and client MAC addresses and the identity of VLAN provided by the remote computer to:

assign the client IP address and the client MAC address to the logical interface with the VLAN; and run a sequence of connectivity tests with the end station, when the first port is disabled, utilizing the client IP address and client MAC address as the source addresses;

and reporting the results of the sequence of connectivity tests to facilitate identification of the reasons packets are being dropped;

determining whether the connectivity problem is on the switch, on a device in the network other than the switch, or on a link on the switch;

when packets are dropped at the switch, identifying the reason for the packets being dropped; identifying the feature responsible for dropping the packets, such as failure to respond to Address Resolution Protocol (ARP) queries;

and when packets are dropped or showing errors on a link of the switch, then testing a link where the packets are dropped or showing errors.

2. An apparatus comprising:

a first switch port configured to couple to a client computer, with the client computer having an Internet Protocol (IP) address and a Media Access Control (MAC) address; a second switch port configured to couple to a network;

a third switch port configured to couple to a remote computer;

a memory storing computer program code including a management interface module and a proxy_client module;

a processor, coupled to the memory, configured to execute the management interface module to:

allow the remote computer to be used to select a client computer, connected to the first switch port and having a connectivity problem with an end point device on the network;

allow the remote computer to be used to enter an IP address of the end point device;

initialize the proxy_client module with the IP address and MAC address of the client computer and with the identity of a VLAN on which the client computer is connected;

return results of a sequence of connectivity tests to the remote computer; and with the processor configured to execute the proxy_client module to logically interface with the VLAN on which the client computer is connected with the IP address and MAC address assigned to the client computer and to run a series of tests to troubleshoot a connectivity problem between the client computer and end point device, where the proxy_client module utilizes the IP and MAC addresses of the client computer as source addresses when running the series of tests and with the processor further configured to test a link where the errors are occurring when errors occur;

and where the memory stores a switch_analysis module and with the processor configured to execute the switch_analysis module to identify the reason for the packets being dropped and, when packets are dropped, to identify the feature responsible for dropping the packets, such as failure to respond to Address Resolution Protocol (ARP) queries.

3. A system comprising:

a processor configured to:

assign a client IP address and a client MAC address of a client computer to a logical interface with a VLAN, where the VLAN includes at least a first port of a switch, where the client computer is connected to the first port of the switch and is assigned to the VLAN and where the client computer is having connectivity problems with an end station included in a network coupled to a second port of the switch;

run a sequence of connectivity tests with the end station when the first port of the switch is disabled, utilizing the client IP address and the client MAC address as source addresses;

and report the results of the sequence of connectivity tests to facilitate identification of the reasons packets are being dropped;

identify the reason for the packets being dropped when if packets are dropped at the switch;

identify the feature responsible for dropping the packets, such as failure to respond to Address Resolution Protocol (ARP) queries;

test a link where the packets are dropped or showing errors; and determine whether the problem is on the switch, or on a device in the network other than the network device, or on a link on the switch.

4. A computer program product comprising:

a computer-readable storage medium having computer readable program code physically embodied therein, said computer program product further comprising:

computer readable program code executed by the processor to:

assign a client IP address and a client MAC address of a client computer to a logical interface with a VLAN, where the VLAN includes at least a first port of a switch, where the client computer is connected to the first port of the switch and is assigned to the VLAN and where the client computer is having connectivity problems with an end station included in a network coupled to a second port of the switch;

run a sequence of connectivity tests with the end station when the first port is disabled utilizing the client IP address and the client MAC address as the source addresses; and computer readable program code executed by the processor to report the results of the sequence of connectivity tests;

computer readable program code executed by the processor to determine whether the problem is on the network device, on a device in the network other than the network device, or on a link on the network device;

computer readable program code executed by the processor to identify the reason for the packets being dropped when packets are dropped at the network device;

computer readable program code executed by the processor to identify the feature responsible for dropping the packets, such as failure to respond to Address Resolution Protocol (ARP) queries;

and computer readable program code executed by the processor to test a link where the packets are dropped or showing errors.

* * * * *